(12) United States Patent
Dukes et al.

(10) Patent No.: US 6,705,002 B1
(45) Date of Patent: Mar. 16, 2004

(54) HARNESS WRAP APPLICATION TOOL

(75) Inventors: Joseph Allen Dukes, Sugar Hill, GA (US); Jack E. Caveney, Hinsdale, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 10/243,510

(22) Filed: Sep. 13, 2002

(51) Int. Cl.[7] .............................................. H01R 43/00
(52) U.S. Cl. .......................... 29/825; 29/828; 29/758; 29/749; 29/764; 29/566.4; 29/278; 29/745; 29/748; 254/134.3 R; 7/158; 7/107; 156/433
(58) Field of Search ...................... 29/755, 758, 764, 29/750, 749, 760, 33 F, 566.4, 863, 837, 842, 859, 278, 825, 854, 857, 33 M, 745, 748, 828; 81/488; 7/107, 158; 254/134.3 R, 134.4; 156/433

(56) References Cited

U.S. PATENT DOCUMENTS

| | | | |
|---|---|---|---|
| 2,743,884 A | | 5/1956 | Briggs |
| 2,946,560 A | * | 7/1960 | Ferm ........................ 254/134.3 |
| 3,866,846 A | | 2/1975 | Dorsey |
| 4,432,124 A | | 2/1984 | Breuers |
| 4,951,923 A | | 8/1990 | Couture |
| 5,067,843 A | | 11/1991 | Nova |
| 5,265,326 A | * | 11/1993 | Scribner ....................... 29/758 |
| 5,884,901 A | | 3/1999 | Schilling |
| 5,906,357 A | | 5/1999 | Munson, Sr. |
| 6,137,055 A | * | 10/2000 | Kawamura ................ 174/68.3 |
| 6,302,379 B1 | | 10/2001 | Walters |
| 6,401,784 B1 | * | 6/2002 | Bigot et al. ................. 156/465 |
| 2003/0178086 A1 | * | 9/2003 | Hu .............................. 138/156 |

FOREIGN PATENT DOCUMENTS

| | | |
|---|---|---|
| EP | 1 033 799 A1 | 9/2000 |
| JP | 2001-54216 * | 2/2001 |
| WO | WO 00/52800 | 9/2000 |

OTHER PUBLICATIONS

Richco, Inc. Press Release, 1 page, dated Apr. 24, 2000.
Richco, Inc. Cable & Fiber Management Catalog, p. 135, date unknown.
Hellermann Tyton Cable Protection Systems Catalog, p. 20, date unknown.
Hellermann Tyton Press Release, 1 page, dated Jun. 5, 2001.

* cited by examiner

*Primary Examiner*—Peter Vo
*Assistant Examiner*—Minh Trinh
(74) *Attorney, Agent, or Firm*—Robert A. McCann; Christopher S. Clancy

(57) ABSTRACT

A tool for inserting wires or cables in a flexible harness wrap is disclosed. The tool includes a first member and a second member connected to the first member. The first member has an extension member connected thereto, and a first nose portion extending at an oblique angle from the first bottom end. The second member has a receiving member connected thereto, and a second nose portion extending at an oblique angle from the second bottom end. The first and second members are movable from a first, closed position to a second, open position. The open position is at least 50 degrees from the closed position. A method of inserting wires or cables in a flexible harness wrap is also disclosed.

17 Claims, 8 Drawing Sheets

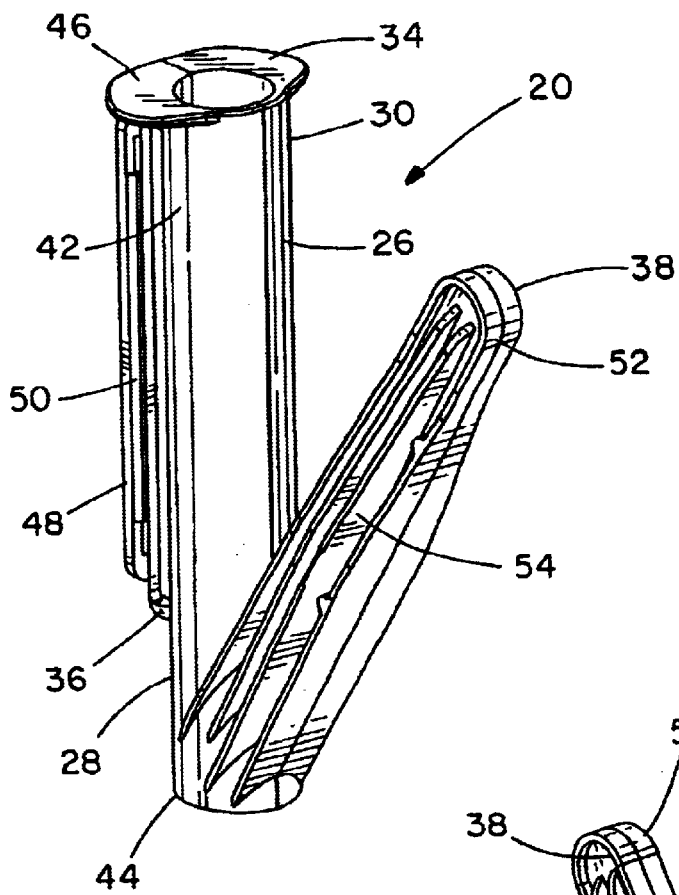
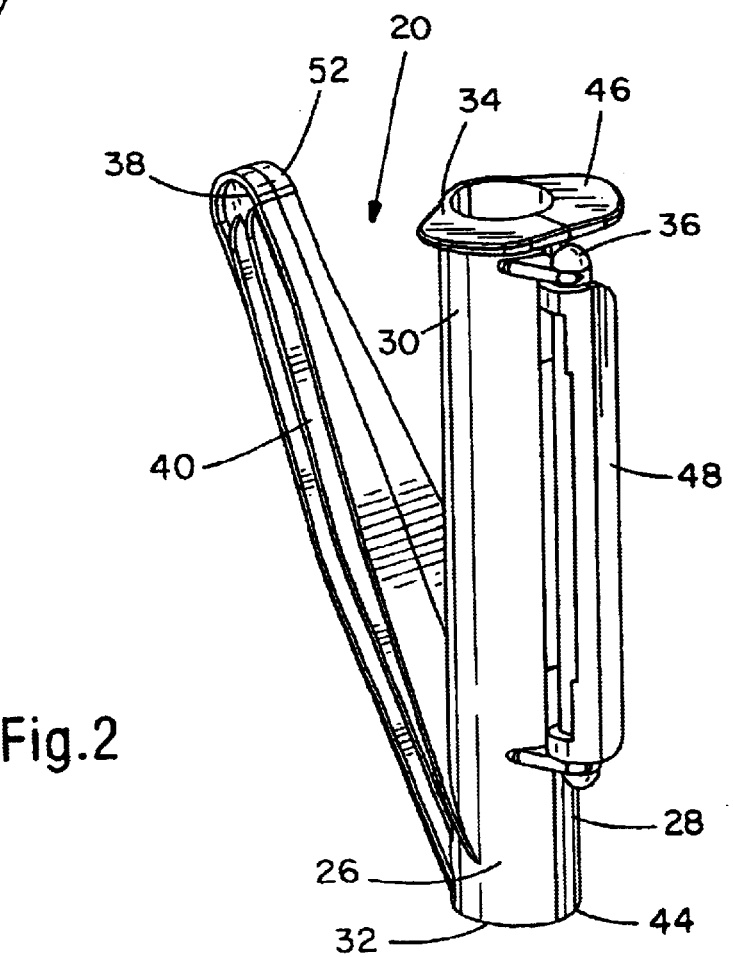

HARNESS WRAP APPLICATION TOOL

BACKGROUND OF THE INVENTION

The present invention is directed to a harness wrap application tool, and more particularly, to a tool for inserting wires or cables in a flexible harness wrap.

Tools for inserting discrete cables in a flexible harness wrap have been used in the telecommunications industry. None of the prior tools provide a user the ability to easily install bundled cables or hoses as well as discrete cables. For example, Hellerman Tyton's Helawrap™ applicator tool has a spring mechanism restricting the tool to about a 48 degree opening in the fully open position. Moreover, Richco's applicator tool disclosed in WO 00/52800 has a tubular sleeve fitted into a cylindrical tubular body. The sleeve and the body each have a small longitudinal opening, which openings can be aligned to allow insertion or removal of discrete cables. However, the Richco tool is restricted to about a 46 degree opening in the fully open position.

It would be desirable to provide a harness wrap application tool that provides a user the ability to easily install bundled cables or hoses as well as discrete cables.

It would also be desirable to provide a harness wrap application tool having an open position that is adjustable between 1 and 180 degrees from the closed position.

SUMMARY OF THE INVENTION

A tool for inserting wires or cables in a flexible harness wrap is disclosed. The tool includes a first member and a second member connected to the first member. The first member has an extension member connected thereto, and a first nose portion extending at an oblique angle from the first bottom end. The second member has a receiving member connected thereto, and a second nose portion extending at an oblique angle from the second bottom end. The first and second members are movable from a first, closed position to a second, open position. The open position is at least 50 degrees from the closed position.

Preferably, the first nose portion is bullet-shaped and has a plurality of ribs along one side thereof. Likewise, the second nose portion is bullet-shaped and has a plurality of ribs along one side thereof.

Preferably, the extension member extends from adjacent the first top end toward the first bottom end, and the receiving member extends from adjacent the second top end toward the second bottom end.

Preferably, the receiving member has a retaining detent for frictionally retaining the extension member within the receiving member, and the retaining detent extends substantially the length of the receiving member.

Preferably, the first member has a first tab extending perpendicular from the first top end. Likewise, the second member has a second tab extending substantially perpendicular from the second top end.

Preferably, the open position is at least 90 degrees from the closed position. More preferably, the open position is about 180 degrees from the closed position.

BRIEF DESCRIPTION OF FIGURES

FIG. 1 is a front perspective view of a harness wrap application tool according to the present invention;

FIG. 2 is a rear perspective view of the tool of FIG. 1;

DETAILED DESCRIPTION OF PREFERRED EMBODIMENTS

The illustrated embodiments of the invention are directed to a harness wrap application tool for inserting wires or cables in a flexible harness wrap.

FIG. 1 shows a 2-piece harness wrap application tool 20 molded from a suitable thermoplastic material. The tool is utilized to insert wires or cables 22 in a flexible harness wrap 24, as shown in FIGS. 8–12, such as the harness wrap disclosed in co-pending U.S. Ser. No. 10/243,821, the disclosure of which is incorporated by reference in its entirety.

Figure 6:
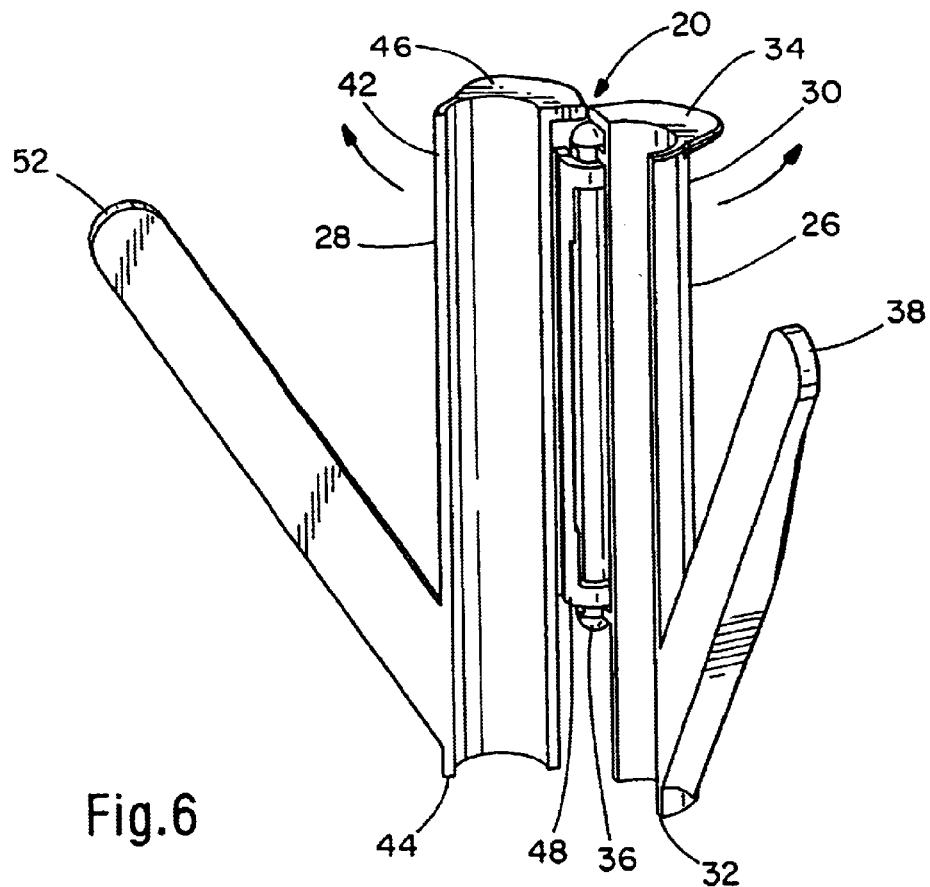
FIG. 6 is a perspective view of the tool of FIG. 1 in a partially open position.

As shown in FIGS. 1–2 and best seen in FIG. 6, the tool 20 includes a first member 26 and a second member 28. The first member 26 has a first top end 30 and a first bottom end 32, with a first tab 34 extending from the first top end 30. Preferably, the first tab 34 extends substantially perpendicular from the first top end 30. The first member 26 includes an extension member 36 connected thereto. Preferably, as shown in FIG. 2, the extension member 36 extends from near the first top end 30 toward the first bottom end 32.

Figure 3:
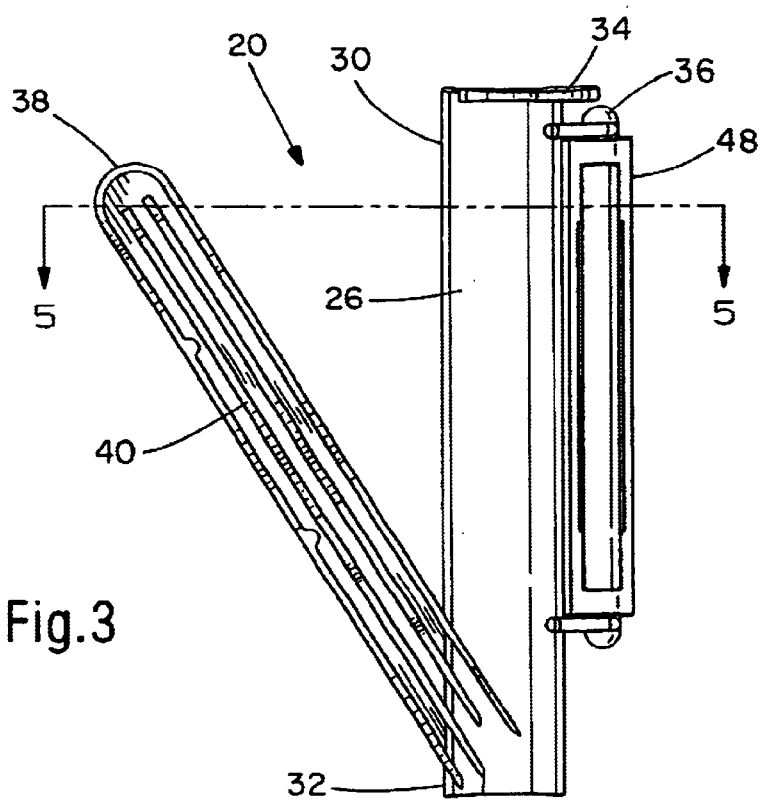
FIG. 3 is a right side view of the tool of FIG. 1.

The first member 26 also includes a first nose portion 38 extending at an oblique angle from the first bottom end 32. Preferably, and as shown in FIGS. 1–3, the first nose portion 38 is bullet-shaped and has a plurality of ribs 40 along one side thereof. The first nose portion 38 eases transition of the flexible harness wrap 24 onto the wires or cables 22 to be secured therein.

As shown in FIGS. 3–6, the second member 28 is hingedly connected to the first member 26. The second member 28 has a second top end 42 and a second bottom end 44, with a second tab 46 extending from the second top end 42. Preferably, the second tab 46 extends substantially perpendicular from the second top end 42.

Figure 5:
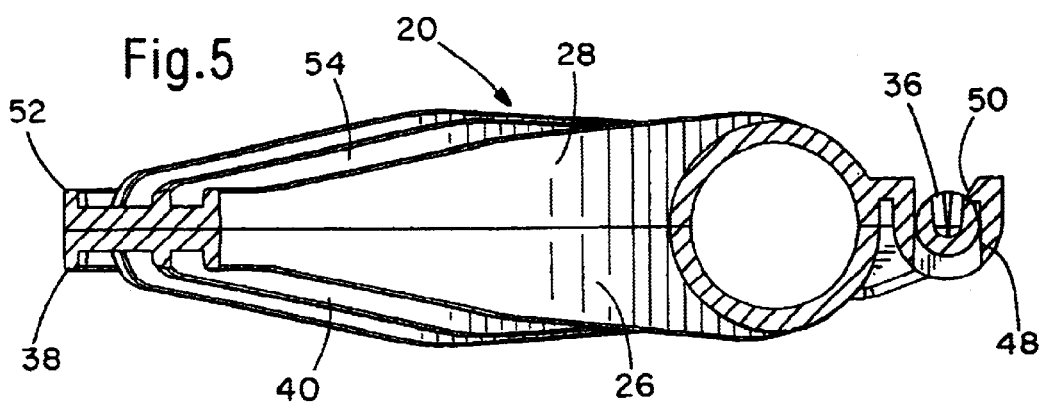
FIG. 5 is a cross-sectional view taken along lines 5—5 of FIG. 3.

The second member 28 includes a receiving member 48 connected thereto. Preferably, as shown in FIG. 2, the receiving member 48 extends from near the second top end 42 toward the second bottom end 44. Moreover, as best seen in FIG. 5, the receiving member 48 has a retaining detent 50. The retaining detent 50 holds the first and second members 26, 28 together, and maintains frictional tension when the tool 20 is in the closed position. The detent 50 also provides user feedback that the tool 20 is fully closed. Further, the detent 50 provides resistance to inadvertent opening of the tool 20 when in the closed position. Preferably, the retaining detent 50 extends substantially the length of the receiving member 48.

Figure 4:
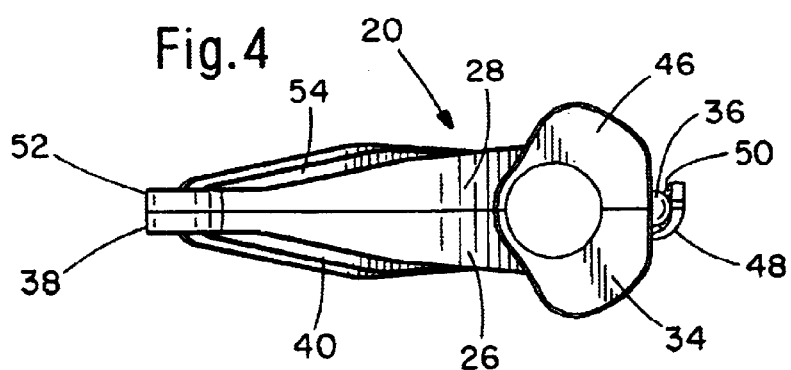
FIG. 4 is a top view of the tool of FIG. 1.

The second member 28 also includes a second nose portion 52 extending at an oblique angle from the second bottom end 44. Preferably, as shown in FIGS. 4–5, the second nose portion 52 is bullet-shaped and has a plurality of ribs 54 along one side thereof. The second nose portion 52 eases transition of the flexible harness 24 wrap onto the wires or cables 22 to be secured therein.

Figure 7:
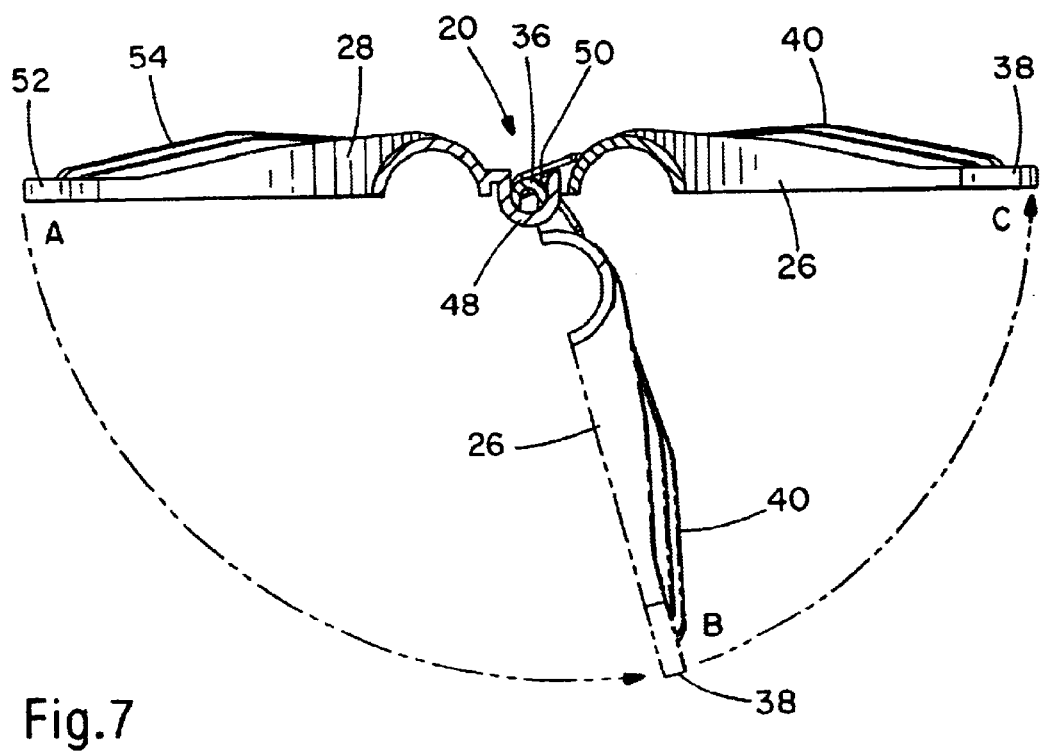
FIG. 7 is a top view of the tool of FIG. 1 showing the tool movement from a fully closed position to a partially open position to a fully open position.
Figure 8:
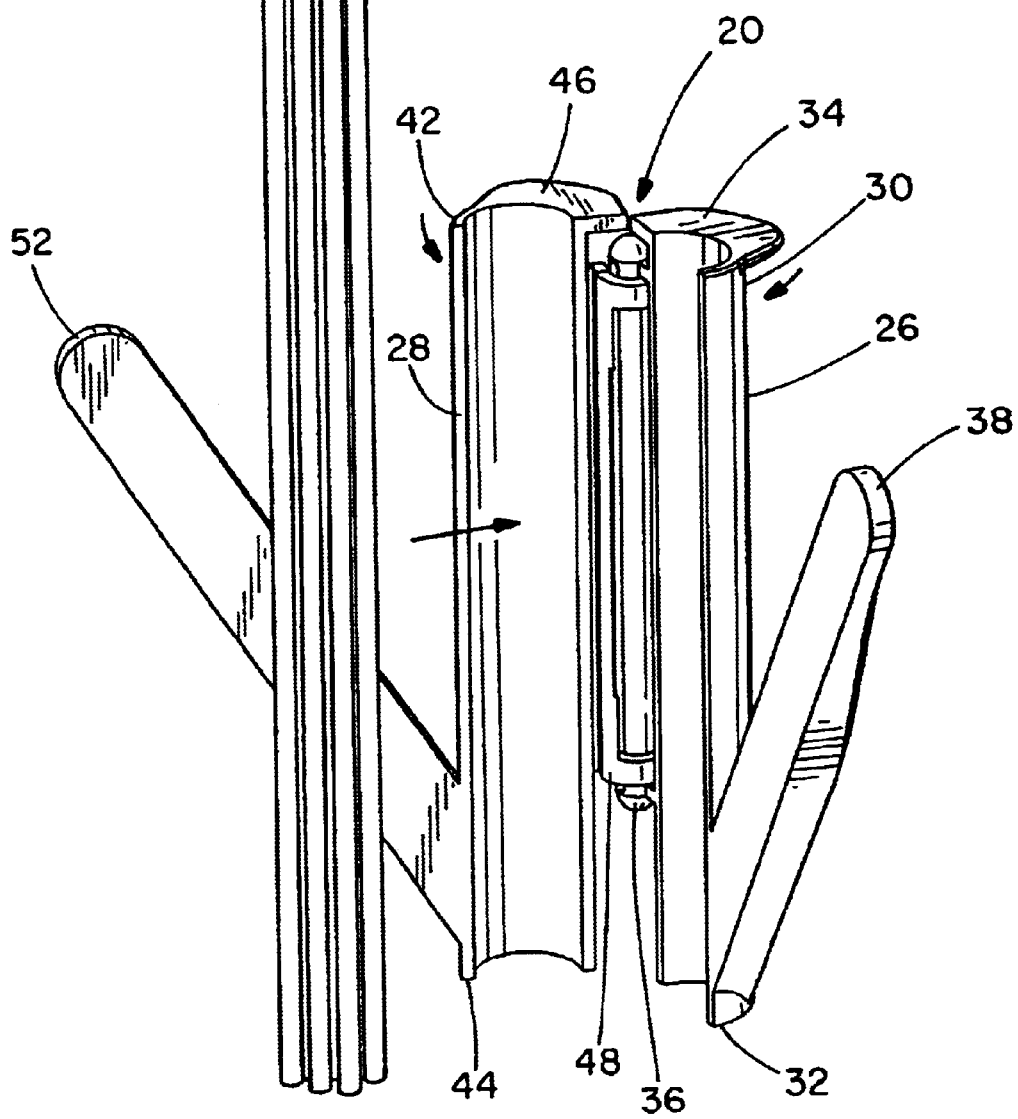
FIG. 8 is a view similar to FIG. 6 showing bundled cables being inserted into the tool.

The first and second members 26, 28 are movable from a first closed position, as shown in FIGS. 1–5, to a second, open position, as shown in FIGS. 6–8. As shown in FIG. 6, the open position is at least 50 degrees from the closed position. FIG. 7 shows the tool moving from a fully closed position A to a partially open position B of at least 90 degrees to a fully open position C. As shown in FIG. 7, the fully open position C is about 180 degrees from the fully closed position A. Unlike prior harness wrap application tools, the present invention teaches that the open position is adjustable anywhere between 1 and 180 degrees from the closed position. As a result, the two-piece tool of the present invention does not require secondary metal accessories or springs.

Figure 9:
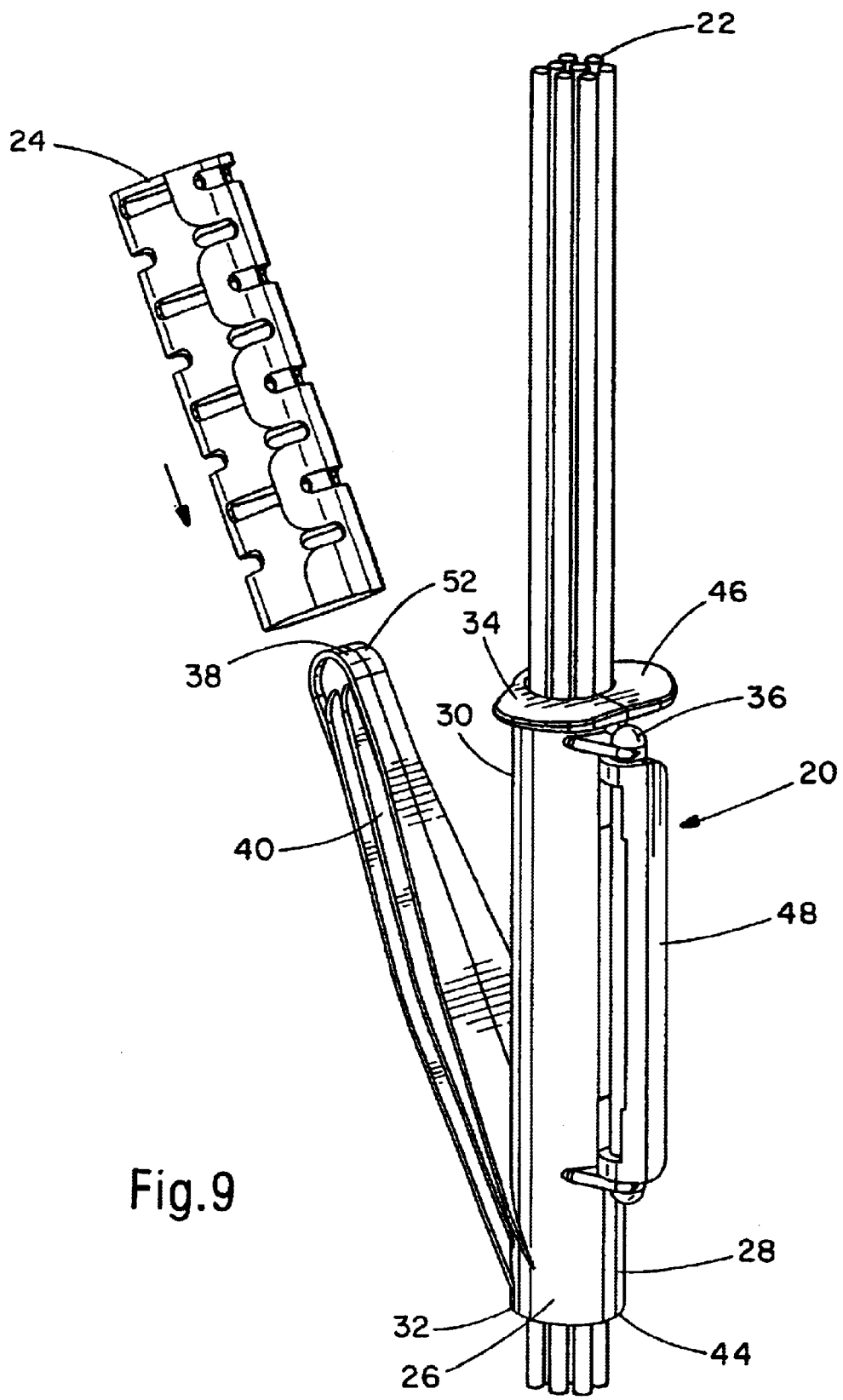
FIG. 9 is a rear perspective view of the tool of FIG. 1 prior to insertion of the tool into a flexible harness wrap.
Figure 10:
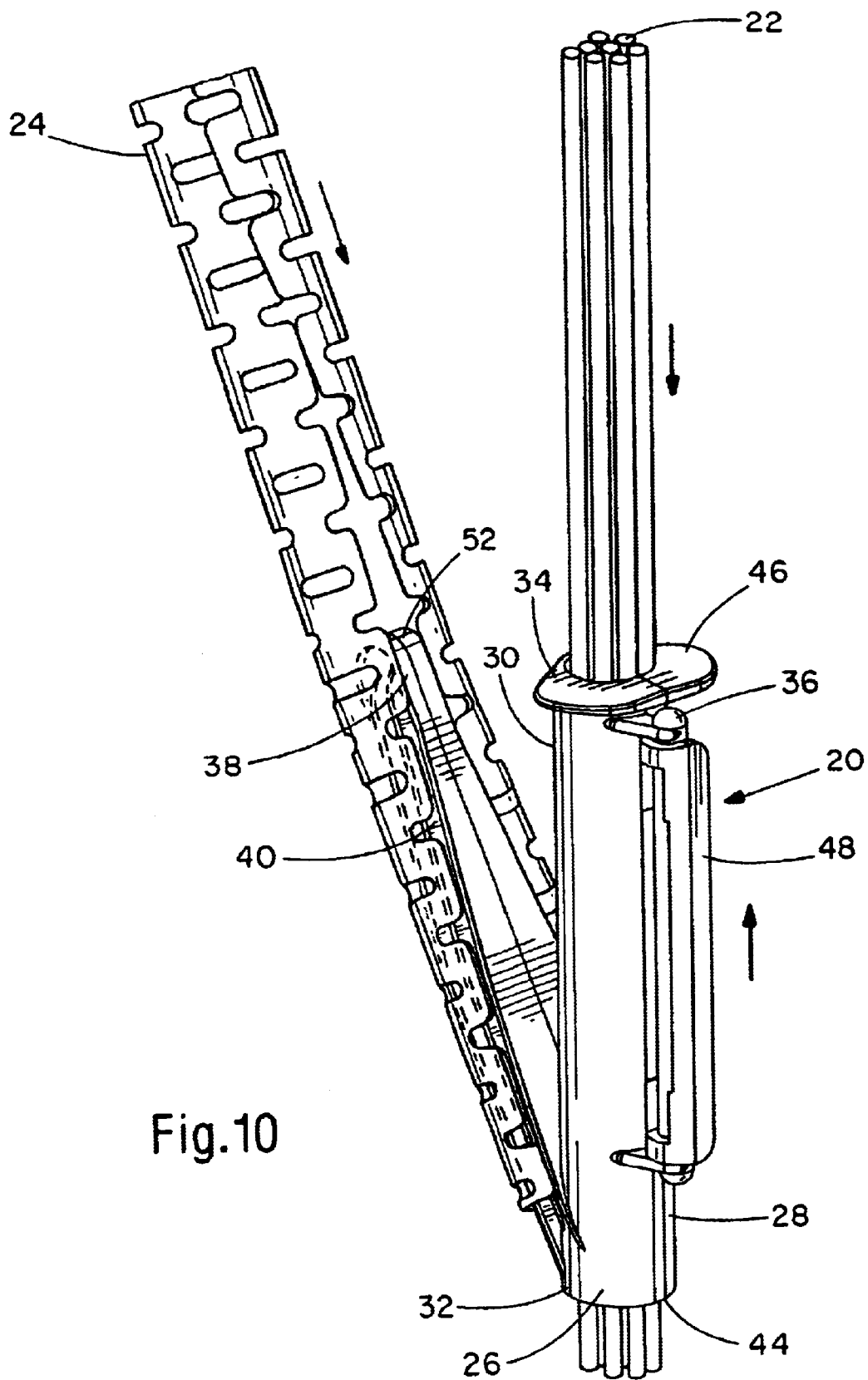
FIG. 10 is a rear perspective view of the tool of FIG. 1 after the tool has been inserted into a flexible harness wrap.
Figure 11:
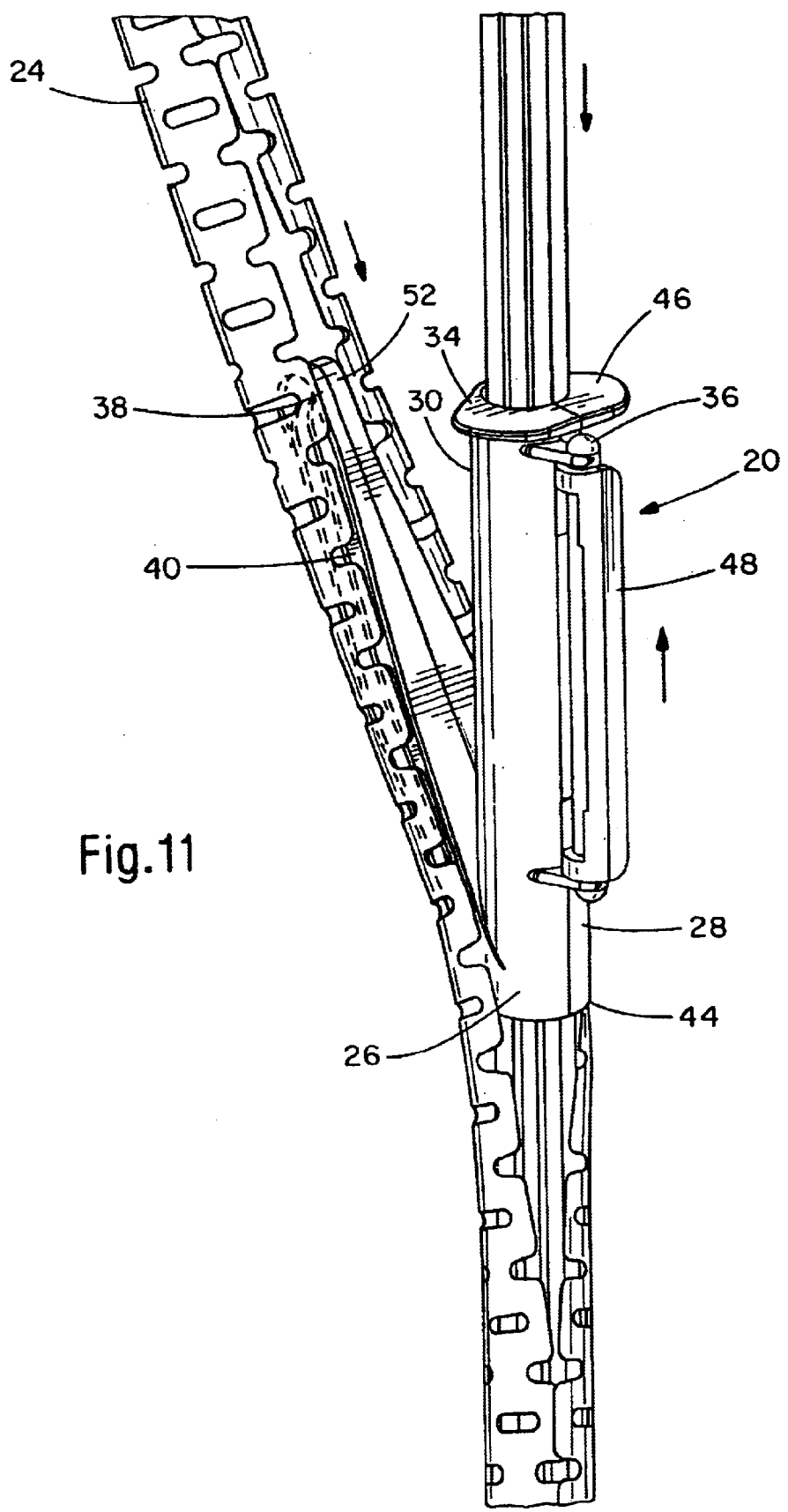
FIG. 11 is a rear perspective view of the tool of FIG. 1 showing the flexible harness wrap being applied to bundled cables.
Figure 12:
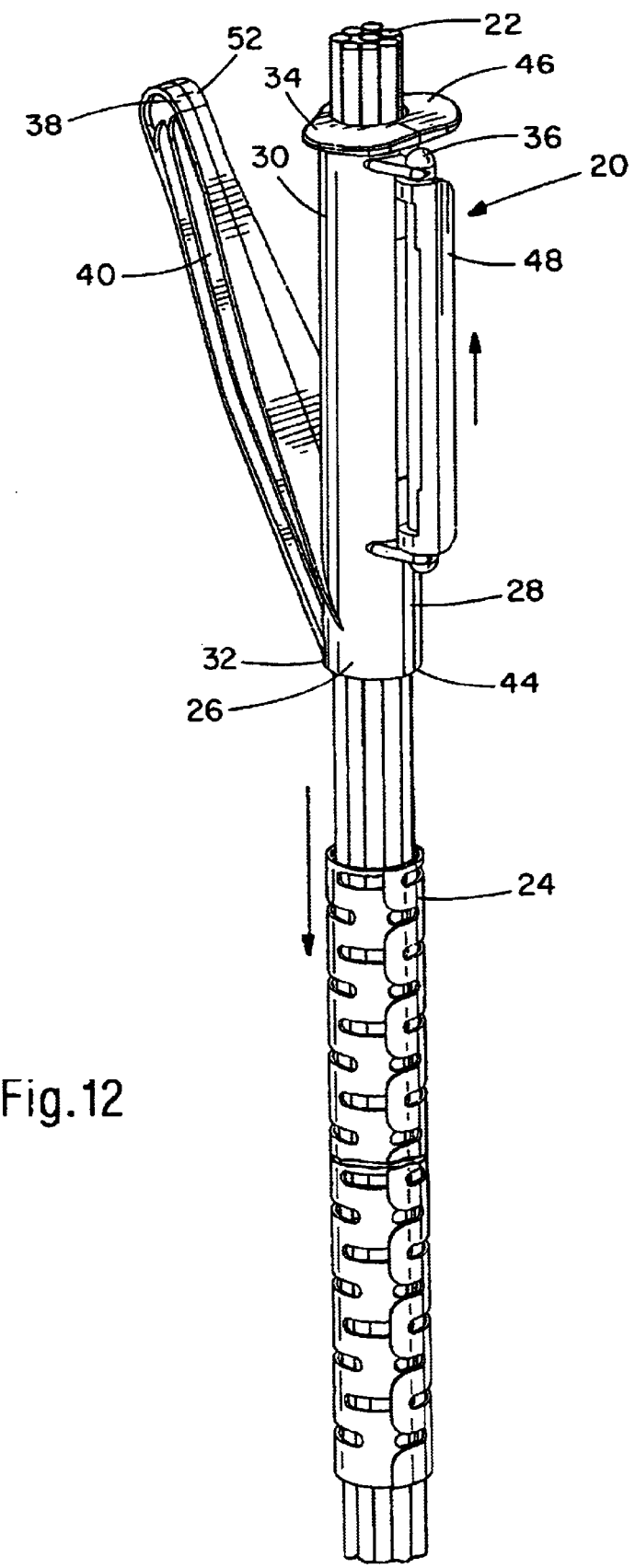
FIG. 12 is a rear perspective view of the tool of FIG. 1 after the flexible harness wrap has been applied to the bundled cables.

In operation, the first and second members 26, 28 are snapped together to form the harness wrap application tool 20. Preferably, the tool 20 has a clam shell appearance. As shown in FIG. 8, the tool 20 is moved to an open position at least 50 degrees from the closed position. The user can insert bundled cables or hoses as well as individual cables into the tool 20. The tool 20 is then closed to retain the cables 22 therein, as seen in FIG. 9. In FIG. 10, the first and second nose portions 38, 52 have been inserted into an opening in the flexible harness wrap 24. The user then engages the first and second tabs 34, 46 located on the top ends 30, 42 of the first and second members, 26, 28 respectively. As shown in FIG. 11, as the tool 20 is moved in the direction of the arrow, the first and second nose portions 38, 52 of the tool 20 are moved through the flexible harness wrap 24 until the wires or cables 22 are laid therein, as shown in FIG. 12. The tool 20 can then be opened and removed from the wires or cables 22.

The disclosed invention provides a harness wrap application tool for inserting wires or cables in a flexible harness wrap. The tool is movable from a first, closed position to a second, open position, with the open position being at least 50 degrees from the closed position. It should be noted that the above-described and illustrated embodiments and preferred embodiments of the invention are not an exhaustive listing of the forms such a harness wrap application tool in accordance with the invention might take; rather, they serve as exemplary and illustrative of embodiments of the invention as presently understood. By way of example, and without limitation, a harness wrap application tool only movable between distinct positions from one to 180 degrees is contemplated to be within the scope of the invention. Many other forms of the invention are believed to exist.

What is claimed is:

1. A tool for inserting wires or cables in a flexible harness wrap, the tool comprising:

a first member having a first top end and a first bottom end, the first member having an extension member connected thereto and a first nose portion extending at an oblique angle from the first bottom end; and a second member connected to the first member, the second member having a second top end and a second bottom end, the second member having a receiving member connected thereto and a second nose portion extending at an oblique angle from the second bottom end, wherein the first and second members are movable from a first, closed position to a second, open position, the open position being at least 50 degrees from the closed position.

2. The tool of claim 1 wherein the first nose portion is bullet-shaped and has a plurality of ribs along one side thereof.

3. The tool of claim 1 wherein the second nose portion is bullet-shaped and has a plurality of ribs along one side thereof.

4. The tool of claim 1 wherein the extension member extends from adjacent the first top end toward the first bottom end.

5. The tool of claim 1 wherein the receiving member extends from adjacent the second top end toward the second bottom end.

6. The tool of claim 1 wherein the receiving member has a retaining detent for frictionally retaining the extension member within the receiving member.

7. The tool of claim 6 wherein the retaining detent extends substantially the length of the receiving member.

8. The tool of claim 1 wherein the first member has a first tab extending from the first top end.

9. The tool of claim 8 wherein the first tab extends substantially perpendicular from the first top end.

10. The tool of claim 1 wherein the second member has a second tab extending from the second top end.

11. The tool of claim 10 wherein the second tab extends substantially perpendicular from the second top end.

12. The tool of claim 1 wherein the open position is at least 90 degrees from the closed position.

13. The tool of claim 1 wherein the open position is about 180 degrees from the closed position.

14. A tool for inserting wires or cables in a flexible harness wrap, the tool comprising:

a first member having a first top end and a first bottom end, the first member having an extension member connected thereto and a first nose portion extending at an oblique angle from the first bottom end; and a second member connected to the first member, the second member having a second top end and a second bottom end, the second member having a receiving member connected thereto and a second nose portion extending at an oblique angle from the second bottom end, wherein the first and second members are movable from a first, closed position to a second, open position, the open position being adjustable between 1 and 180 degrees from the closed position.

15. A method of inserting wires or cables in a flexible harness wrap, the method comprising the steps of:

providing a tool comprising a first member having an extension member connected thereto and a first nose portion extending at an oblique angle from a bottom end of the first member, and a second member connected to the first member, the second member having a receiving member connected thereto and a second nose portion extending at an oblique angle from a bottom end of the second member;

opening the tool to an open position at least 50 degrees from a closed position;

inserting the wires or cables into the tool;
closing the tool to retain the wires or cables therein;
inserting the first and second nose portions into an opening in the flexible harness wrap; and
moving the tool through the flexible harness wrap until the wires or cables are laid therein.

16. The method of claim 15 wherein the open position is at least 90 degrees from the closed position.

17. The method of claim 15 wherein the open position is about 180 degrees from the closed position.

* * * * *